United States Patent [19]

Phelan

[11] Patent Number: 4,713,665

[45] Date of Patent: Dec. 15, 1987

[54] GROUND SPEED SENSOR

[75] Inventor: James J. Phelan, Bettendorf, Iowa

[73] Assignee: Deere & Company, Moline, Ill.

[21] Appl. No.: 6,331

[22] Filed: Feb. 2, 1987

Related U.S. Application Data

[63] Continuation of Ser. No. 609,626, May 14, 1984, abandoned.

[51] Int. Cl.$^4$ .............................................. G01J 9/44
[52] U.S. Cl. .................................................... 342/104
[58] Field of Search ............... 342/104, 107, 113, 103; 367/91; 356/28.5

[56] References Cited

U.S. PATENT DOCUMENTS

| | | |
|---|---|---|
| 3,021,521 | 2/1962 | Hutchins . |
| 3,094,693 | 6/1963 | Taylor ..................... 343/8 |
| 3,099,832 | 7/1963 | Frelich .................... 343/8 |
| 3,719,923 | 3/1973 | Waterman ............... 367/91 |
| 3,795,893 | 3/1974 | Kritz et al. . |
| 3,863,198 | 1/1975 | Lerner . |
| 3,893,076 | 7/1975 | Clifford .................. 367/91 |
| 3,895,384 | 7/1975 | Fathauer et al. ...... 343/9 R |
| 3,896,788 | 7/1975 | Sato . |
| 4,020,490 | 4/1977 | Millard ................... 342/103 |
| 4,052,722 | 10/1977 | Millard ................... 342/103 |
| 4,079,377 | 3/1978 | Zur Heider et al. .... 343/9 |
| 4,172,256 | 10/1979 | Pacozzi .................. 342/103 |
| 4,186,397 | 1/1980 | Sternberger et al. .. 342/125 |
| 4,225,950 | 9/1980 | Kotera et al. .......... 367/97 |
| 4,231,039 | 10/1980 | Fritzler et al. ......... 343/8 |
| 4,276,548 | 6/1981 | Lutz ....................... 342/103 |
| 4,354,191 | 10/1982 | Matsumura et al. ... 343/7.5 |
| 4,359,734 | 11/1982 | Bachman ................ 343/8 |

FOREIGN PATENT DOCUMENTS

| | | |
|---|---|---|
| 3017480 | 11/1981 | Fed. Rep. of Germany . |
| 2354565 | 6/1976 | France . |
| 8301120 | 9/1981 | PCT Int'l Appl. . |
| 2101831 | 1/1983 | United Kingdom . |

OTHER PUBLICATIONS

Egawa, "A Microwave Doppler Radar Velocity Meter for Construction Machinery", SAE Paper No. 821083.
Gorfs and Benson, "Maximizing Dozer Work Rate with Draft Power Sensing Systems, SAE Paper No. 790510.
Tsuha et al., "Radar True Ground Speed Sensor for Agricultural and Off-Road Equipment", SAE Paper No. 821059.
"Digital Frequency Tracker", pp. 13–17, Analog Phase Locked Loop, W. D. Stanley, Oct. 1971.
"Theory of LDV Tracking Systems", T. S. Darrani, Jul. 1974.

Primary Examiner—Thomas H. Tarcza
Assistant Examiner—D. E. Hayes

[57] ABSTRACT

An ultrasonic ground speed sensor has a vehicle-mounted transmitter and a receiver for receiving signals reflected from the transmitter to the receiver by terrain over which the vehicle travels. An attenuated and phase-shifted transmit frequency is superimposed upon an output of the receiver to cancel cross talk, thus providing a substantially pure reflected frequency. A phase-locked loop converts the reflected frequency to a voltage which represents the direction and speed of the vehicle.

7 Claims, 3 Drawing Figures

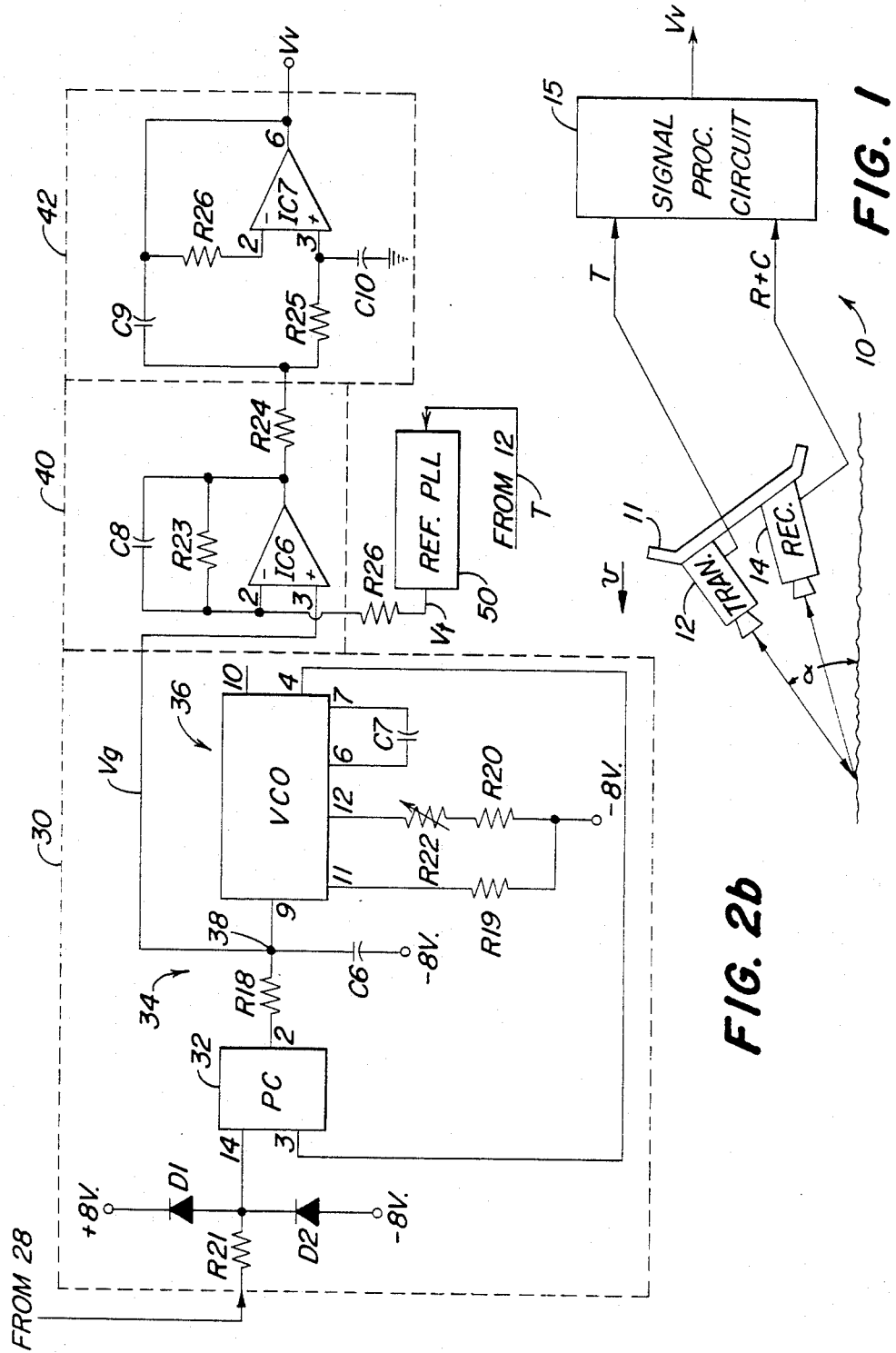

GROUND SPEED SENSOR

This application is a continuation of application Ser. No. 609,626, filed May 14, 1984, now abandoned.

BACKGROUND OF THE INVENTION

This invention relates to a sensor for sensing the ground speed of a vehicle, such as an agricultural vehicle.

Doppler-type ground speed sensing systems are well known. The velocity, v, can be determined from frequency shift, $\Delta f$, by a modified Doppler equation:

$$v = c \frac{\Delta f}{2 f(t)} \times \frac{1}{\cos \alpha}$$

where c is the signal or wave propagation speed, where $\alpha$ is the angle of the transmission axis from horizontal, and where f(t) is the transmitted signal frequency. Conventional Doppler radar systems include a homodyne detector which mixes the transmitted signal with the received signal, thereby producing a frequency which is proportional to the absolute value of the difference between the transmit and receive frequencies. With such systems, it is impossible to distinguish between forward and backward motion. Furthermore, at low speeds, fluctuations due to waving of grass or vehicle pitching can cause the average indicated speed to be greater than the average actual speed. Another problem with homodyne-type systems is that the response time of the output is proportional to ground speed (frequency shift). At low vehicle speeds, this slow response time may cause inaccuracies. Finally, such a system may yield ambiguous information because a zero frequency output signal from the receiver may be the result of zero ground speed, or it could be the result of a signal "dropout" condition.

SUMMARY OF THE INVENTION

An object of the present invention is to provide a speed sensing system which can sense both the direction and magnitude of the speed of a vehicle.

Another object is to provide a speed sensing system which has no ambiguity with respect to zero speed and signal dropout.

A further object is to provide a speed sensing system which has a response time which is independent of vehicle speed.

These and other objects are achieved by the present vehicle speed sensing system which includes an ultrasonic transmitter and an ultrasonic receiver for receiving a signal reflected from terrain over which the vehicle travels. At zero speed, the receiver output frequency is equal to the transmit frequency. Because the reflected frequency is directly detected, the zero speed situation can be distinguished from the signal dropout situation where there is no receiver output. A signal processing circuit superimposes an attenuated, phase-shifted transmit frequency upon the output of the receiver to cancel out cross talk between the transmitter and receiver, thus providing a substantially pure, unmixed reflected frequency. The signal processing circuit also includes a phase-locked loop circuit which receives the pure reflected frequency and which generates an output voltage with an amplitude and sign corresponding to the amplitude and sign of a difference derived by subtracting a constant frequency from the reflected frequency. The output voltage thus provides an indication of the speed and direction (forwards or backwards) of the vehicle motion.

BRIEF DESCRIPTION OF THE DRAWINGS

FIG. 1 is a simplified schematic of the present invention.

FIGS. 2a and 2b are schematic diagrams of the signal processing circuit of FIG. 1.

DETAILED DESCRIPTION

Figure 2A:
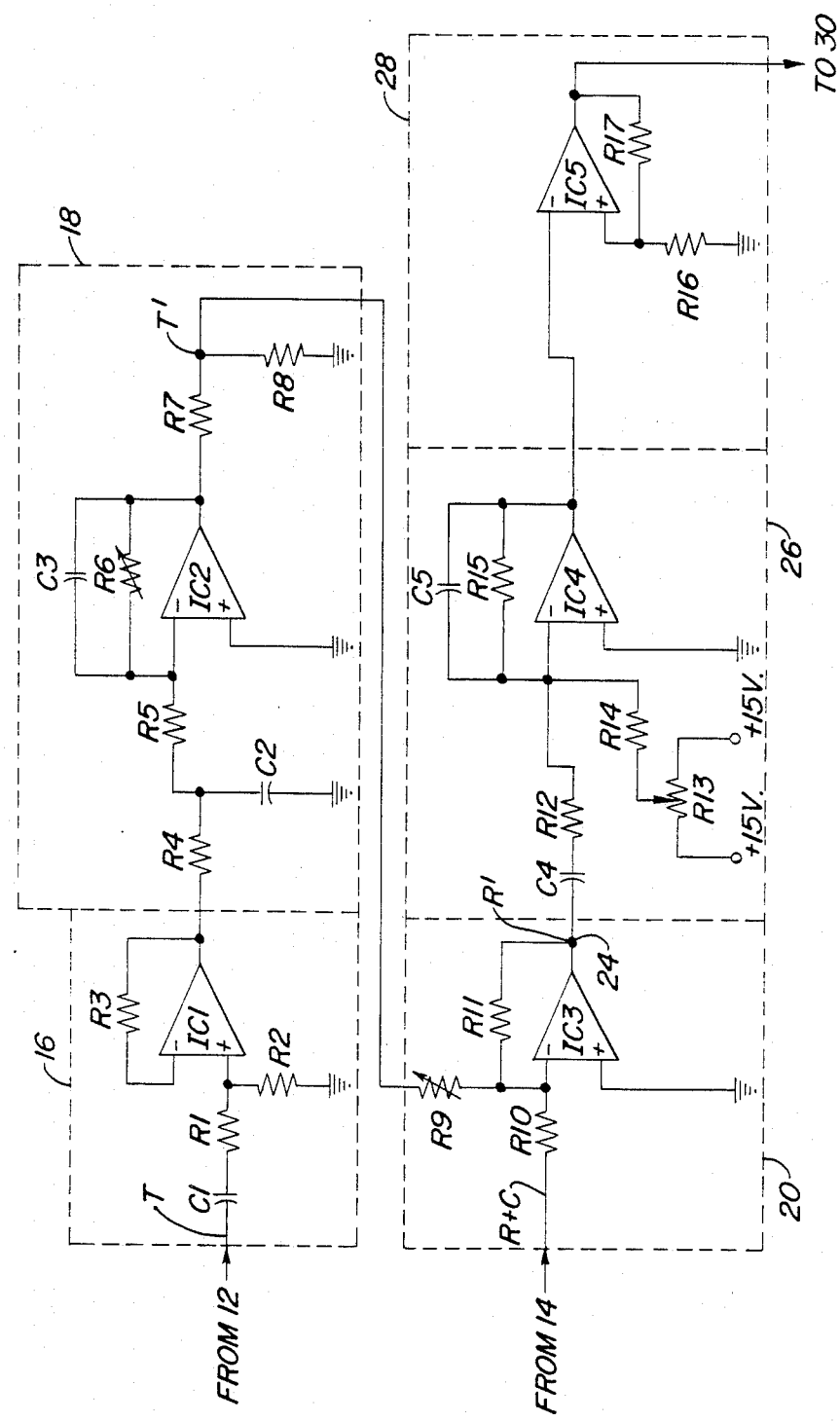

The ground speed sensing system 10 for mounting on a vehicle lower frame member 11 includes a conventional ultrasonic (generally 20–200 kilohertz (kHz) transmitter 12, such as which continuously transmits an ultrasonic signal, T, at a preferred transmit frequency, f(t), of 40 kHz. The system also includes a conventional ultrasonic receiver 14. One such transmitter and receiver is available from the Southwest Research Institute and is described in SAE Paper 790510 by Gorfs and Benson. However, an equivalent transmitter and receiver would also suffice. The receiver 14 receives reflected ultrasonic signals, R, with frequency f(r), which are reflected from the terrain over which the vehicle travels. If the transmitter 12 and receiver 14 are aimed towards the ground in the forward direction with respect to vehicle motion, then the reflected signal, R, will have a reflected frequency, f(r), which will be higher than f(t) if the vehicle and system 10 are moving forward. Conversely, f(r) will be lower than f(t) if the vehicle and system 10 are moving in reverse. In actuality, the output of the receiver will contain an f(r) component and a "cross talk" component "C" with frequency f(t) due to cross talk between the transmitter 12 and the receiver 14.

A signal processing circuit 15 includes a buffer 16 which receives the transmit signal, T, from a pre-amp (not shown) of the transmitter 12. Buffer 16 includes a capacitor C1, three identical resistors, R1, R2 and R3 and an integrated circuit operational amplifier IC1.

The output of buffer 16 is coupled to an attenuation and phase-shift circuit 18. Circuit 18 includes resistors R4 and R5, capacitor C2, an op-amp, IC2, feedback capacitor C3, variable phase-adjust resistor R6 and voltage divider resistors R7 and R8. Circuit 18 attenuates and phase shifts the transmit signal, T, and provides a phase-shifted and attenuated output, T'.

The T' signal is applied to a variable (amplitude adjusting) resistor R9 of summing circuit 20. Summing circuit 20 also includes resistors R10 and R11 and op-amp IC3. Resistor R10 receives the output (R+C) of receiver 14 so that the receiver output can be superimposed on the T' signal. Preferably, the phase and amplitude of T' is such that it just cancels out the cross talk component C of the receiver output, leaving a voltage or modified signal at 24 which is an amplified signal, R', having a substantially pure reflected frequency, f(r). This reflected frequency f(r) is "unmixed" in the communications technology sense of that term in that the reflected frequency f(r) is produced by circuit 20 which has no homodyne or heterodyne mixer.

This signal R' with the pure reflected frequency, f(r), is received by a low pass filter and amplifier circuit 26. Circuit 26 includes capacitors C4 and C5, a comparator input, bias adjust potentiometer R13, resistors R12, R14 and R15 and an op-amp IC4.

The output of circuit 26 is received by a comparator circuit 28 which includes an op-amp, IC5, and resistors R16 and R17. This is essentially a "squaring" circuit with hysteresis to eliminate low level noise.

The output of circuit 28 is received by a phase-locked-loop (PLL) circuit 30. PLL circuit 30 includes a resistor R21, a pair of diodes D1 and D2, a phase comparator (PC) 32, a low pass filter 34, (including resistor R18 and a capacitor C6) and a voltage controlled oscillator (VCO) 36. The VCO 36 preferably includes resistors R19 and R20, variable resistor R22 and capacitor C7 and is powered by +8 and −8 volts. The PLL 30 provides a voltage, Vg, at 38, which has a magnitude and sign corresponding to the magnitude and sign of the difference:

$$f(r) = \text{constant.}$$

As an alternative to a PLL, a slope detector with a low pass filter characteristic could be used instead.

This difference is, in turn, proportional to the ground speed of the vehicle (not shown), less a constant. Preferably, the voltage, Vg, is conditioned by a buffer amplifier 40 which includes a capacitor C8, resistors R23 and R24 and an differential op-amp IC6. Finally, the voltage, Vg is conditioned by a noise-limiting, 2-pole, low pass filter circuit 42. Circuit 42 includes resistors R25 and R26, capacitors C9 and C10 and an op-amp IC7. Preferably, filter circuit 42 has a break frequency of 10 Hz and a damping factor of 0.71. This provides, at the output of IC7, an output voltage, Vv, with a magnitude representing the speed of the vehicle and with a sign representing the direction of vehicle travel (forward or reverse). Of course, by providing an offset level, then the direction information could be represented by whether the output voltage is above or below the offset level, not by whether it is positive or negative.

An optional feature would be to provide an additional or reference PLL 50 identical to PLL 30. This reference PLL 50 would receive the transmit signal T from transmitter 12 and would provide a reference output voltage Vt which would be proportional to f(t), less a constant. This reference voltage Vt would be coupled to the (−) input of IC6 via a resistor R26. The differential op-amp IC6 generates at its output a voltage which is proportional to the difference between the signals applied to its (+) and (−) inputs. In this manner, drift in the transmit frequency or in the PLLs 30 and 50 would be cancelled and the voltage Vv would be relatively uneffected by component drift.

Suggested component values for the circuit 15 are listed in the following table:

| Capacitors | |
|---|---|
| C1 | .0015 MF |
| C2, C7 | .001 MF |
| C3, C5 | 100 pF |
| C4, C10 | 1 MF |
| C8 | 47 pF |
| C9 | 3 MF |
| C6 | .01 MF |

| Resistors (Ohm) | | Diodes | |
|---|---|---|---|
| R1, R2, R3 | 1 M | D1, D2 | IN914 |
| R4 | 3.9k | | |
| R5 | 75k | | |
| R7, R14, R17 | 100k | | |
| R8, R21 | 10k | | |
| R10, R16 | 2.2k | | |
| R11, R26 | 22k | | |
| R12 | 2k | | |
| R15 | 39k | | |
| R18 | 6.8k | | |

-continued

| R19 | 390k |
|---|---|
| R20 | 62k |
| R23, R26 | 68k |
| R24 | 18k |
| R25 | 4.7k |
| R6, R9 | Variable 0–100k |
| R16, R13 | 25k potentiometer |
| R22 | Variable 0–10k |
| ICs | |
| IC1-5 | LF 356 (Motorola or equiv.) |
| PL(32), VCO(36) | CD 4046 (RCA or equiv.) |
| IC6, 7 | MC 34001 (Motorola) |

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:
1. A velocity sensor for sensing the velocity of a vehicle moving over a terrain, the velocity sensor comprising:
   a transmitter for transmitting a signal with a certain constant transmit frequency toward the terrain;
   a receiver for receiving a signal reflected from the transmitter to the receiver by the terrain, the reflected signal having a variable reflected frequency dependent upon the speed and direction of the motion of the vehicle with respect to the terrain, the receiver also receiving a cross talk component signal having the same frequency as the transmit frequency, the receiver generating a combined signal having variable reflected frequency and constant transmit frequency components;
   means for converting the transmit signal to an attenuated, phase-shifted signal;
   a summing circuit having a first input receiving the combined signal, a second input receiving the attenuated, phase-shifted signal, the summing circuit operating to cancel the transmit frequency component of the combined signal, the summing circuit thereby providing at an output thereof a modified signal with a substantially pure reflected frequency;
   a first circuit for converting the modified signal to a first voltage having a magnitude proportional to the frequency of the modified signal;
   a second circuit for converting the transmit signal to a second voltage having a magnitude proportional to the transmit frequency; and
   a difference circuit receiving the first and second voltages and generating a third voltage representing a difference between the first and second voltages, the first and second circuits having similar components so that the third voltage is substantially uneffected by component drift.
2. The invention of claim 1, wherein:
   the transmitter continuously transmits the transmit frequency.
3. The invention of claim 1, wherein:
   the output signal has a sign and magnitude corresponding to the direction and speed, respectively, of vehicle movement.
4. The invention of claim 1, wherein the second input of the summing circuit has a variable resistor coupled in series therewith for amplitude adjustment of the attenuated, phase-shifted frequency.

5. The invention of claim 4, further comprising:
a low-pass filter having an output and an input coupled to the output of the summing circuit;
a squaring circuit having an input coupled to the output of the low pass filter and having an output coupled to an input of the first circuit.

6. The invention of claim 1, wherein:
the first and second circuits comprise phase-locked loops.

7. A velocity sensor for sensing the velocity of a vehicle moving over terrain, the velocity sensor comprising:
a transmitter for transmitting an ultrasonic signal with a constant transmit frequency toward the terrain;
a receiver for receiving an ultrasonic signal reflected from the transmitter for the receiver by the terrain, the reflected signal having a reflected frequency dependent upon the speed and direction of the motion of the vehicle with respect to the terrain, the receiver also receiving a cross talk component signal having the same frequency as the transmit frequency, the receiver generating a combined signal having reflected frequency and transmit frequency components;
means for converting the transmitted signal to an attenuated, phase-shifted signal;
a summing circuit having a first input receiving the combined signal, a second input receiving the attenuated, phase-shifted signal, the summing circuit operating to cancel the transmit frequency component of the combined signal, the summing circuit thereby providing at an output thereof a modified signal with a substantially pure reflected frequency;
a first circuit for converting the modified signal to a first voltage having a magnitude proportional to the frequency of the modified signal;
a second circuit for converting the transmit signal to a second voltage having a magnitude proportional to the transmit frequency; and
a difference circuit receiving the first and second voltages and generating a third voltage representing a difference between the first and second voltages, the first and second circuits having similar components so that the third voltage is substantially uneffected by component drift.

* * * * *